United States Patent [19]

Emmerson

[11] 4,452,110
[45] Jun. 5, 1984

[54] PORTABLE LATHE

[76] Inventor: John O. Emmerson, Magnatech, Bradley Park, East Granby, Conn. 06026

[21] Appl. No.: 295,635

[22] Filed: Aug. 24, 1981

[51] Int. Cl.³ .............................................. B23B 3/00
[52] U.S. Cl. ..................................... 82/4 C; 82/21 A; 408/82; 408/130
[58] Field of Search .............. 409/175, 178, 179, 181, 409/182; 82/4 C, 4 R, 21 A, 24 R, 5; 144/205; 408/82, 79, 80, 106, 105, 143, 130, 54, 141, 72 R; 279/33, 4 R

[56] References Cited

U.S. PATENT DOCUMENTS

| | | | |
|---|---|---|---|
| 2,751,822 | 6/1956 | Schiltz | 408/143 |
| 3,124,024 | 3/1964 | Pittman | 82/4 C |
| 3,205,734 | 9/1965 | Headley et al. | 408/56 |
| 3,733,939 | 5/1973 | Paysinger et al. | 82/4 C |
| 3,744,356 | 7/1973 | Slator et al. | 82/4 C |
| 3,917,428 | 11/1975 | Clark | 408/130 |
| 4,126,065 | 11/1978 | Clavin | 82/4 C |
| 4,257,289 | 3/1981 | Groothius | 82/4 C |
| 4,271,733 | 6/1981 | Stone | 82/4 C |
| 4,279,182 | 7/1981 | Miyagawa et al. | 82/4 C |

Primary Examiner—William R. Briggs
Assistant Examiner—Lawrence Meier
Attorney, Agent, or Firm—Prutzman, Kalb, Chilton & Alix

[57] ABSTRACT

A portable lathe for machining the end of a pipe workpiece for butt welding, having a cylindrical shroud with a collar for receiving the workpiece and three equiangularly spaced, hydraulic clamps mounted on the collar for clamping the pipe workpiece therein coaxial with a rotary cutting tool support of the lathe. Three equiangularly spaced, hydraulic actuators provide for axially feeding the tool support during machining and are hydraulically interconnected for damping an unbalanced machining reaction force on the cutting tool support.

7 Claims, 5 Drawing Figures

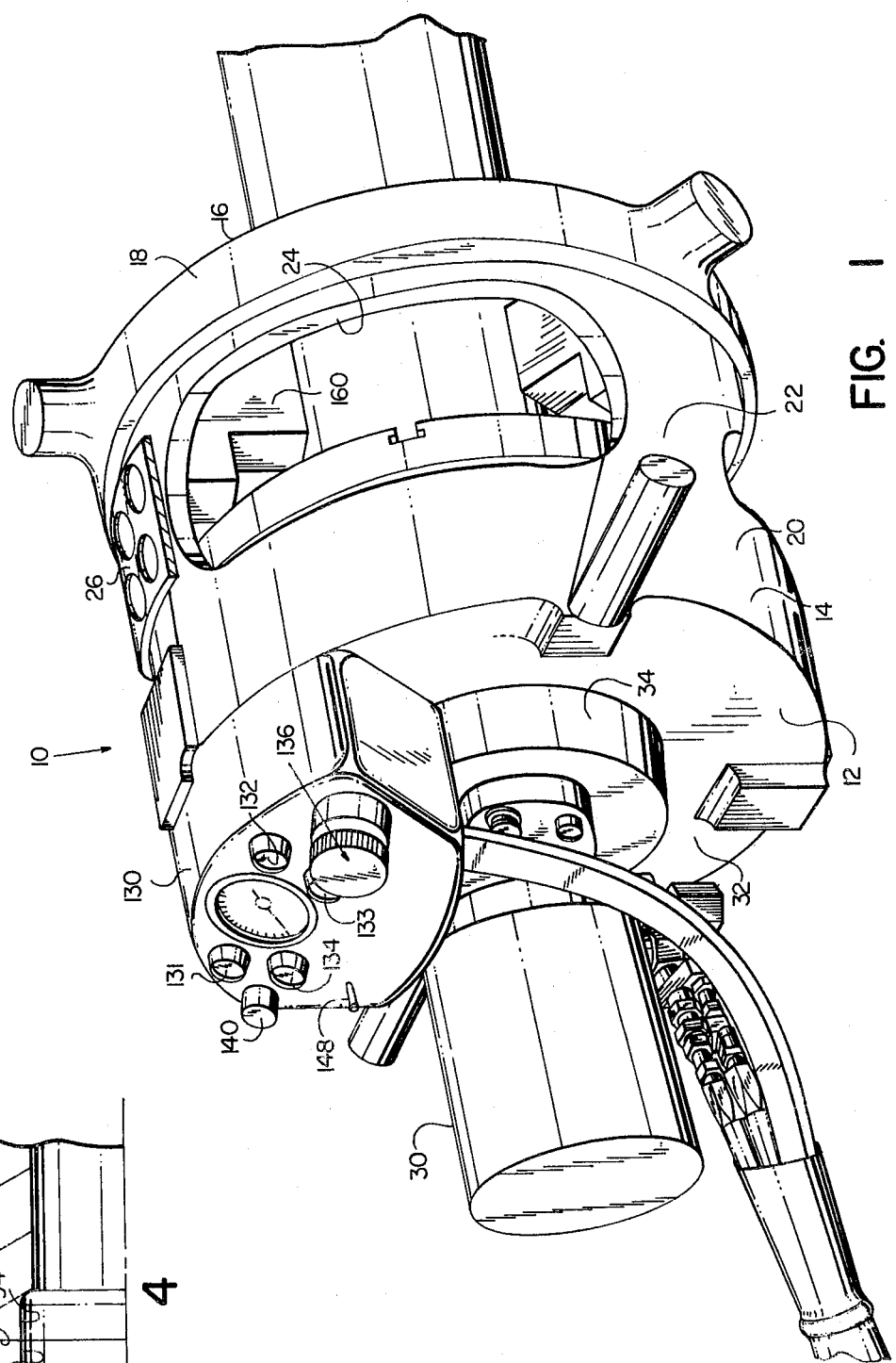
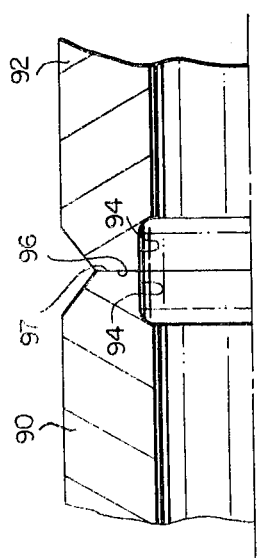

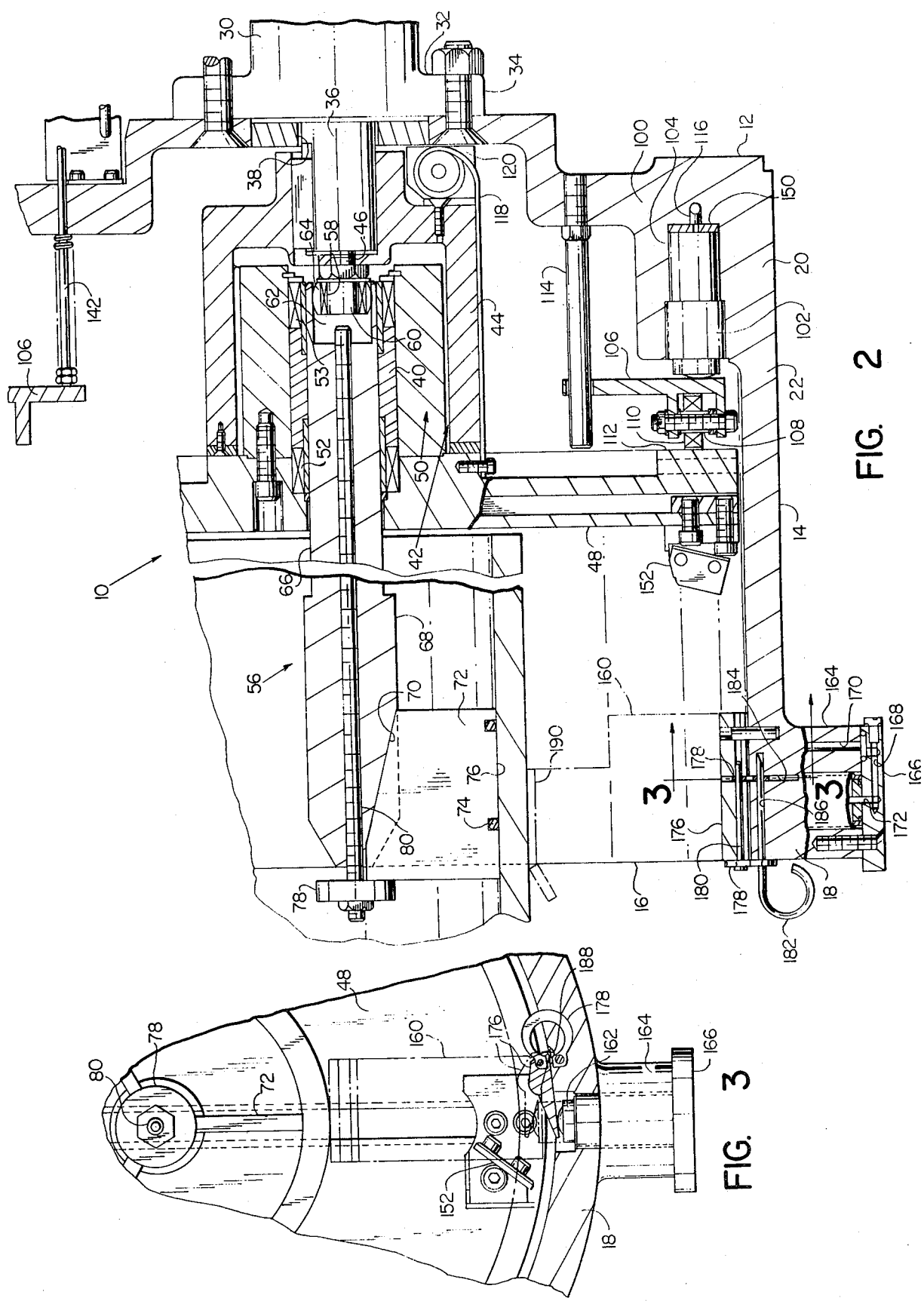

1

PORTABLE LATHE

TECHNICAL FIELD

The present invention relates generally to portable lathes and more particularly to a portable lathe having notable utility in the preparatory machining of pipe ends for butt welding, for example, for use of the pipe in oil, gas or water pipelines.

In the machine or automatic butt welding of sections of pipe, the abutting ends of pipe are first machined in a manner which assures that the resulting butt weld is free of imperfections. The abutting ends of pipe are preferably machined with respect to the axial centerline of the pipe to provide (a) I.D. surfaces which are perfectly round and have the same diameter; (b) abutting "root lands" which have the same I.D. and O.D. dimensions; and (c) abutting coaxial end faces which are square to the axial centerline of the pipe sections and smooth enough to be essentially light-tight when brought into abuttment for welding.

BACKGROUND ART

Conventional prior art portable lathes employed for machining the abutting ends of pipe for welding are constructed to be secured to the pipe by a central support mandrel engaging the internal surface of the pipe. During the machining operation, the lathe cutting tool is rotated and axially fed to machine the pipe end while the lathe is coupled to the pipe via the central support mandrel. Such prior art lathes produce acceptable results when machining medium and large diameter pipe. However, when machining smaller diameter pipe, the reduced strength of the smaller diameter mandrel, primarily its reduced stiffness to bending, results in erratic machining and tool chatter. Economics demands that a given portable lathe be useful for a range of pipe sizes; however, with prior art portable lathe designs, the stiffness requirement at the small end of the pipe size range cannot be met without substantially increasing the lathe weight and therefore without adversely affecting its portability.

DISCLOSURE OF THE INVENTION

In accordance with the present invention, a portable lathe is provided having a new and improved pipe aligning and supporting mechanism and a new and improved tool feed mechanism for substantially reducing or eliminating (a) pipe bending and resulting pipe misalignment and (b) tool chatter and resulting tool wear and breakage and machining imperfections.

The new and improved portable lathe of the present invention possesses the advantages of (a) providing a major portion of the requisite structural stiffness by clamping the lathe to the outer diameter of the pipe after it is centered relative to the inner diameter, and (b) supporting and advancing the lathe cutting tool so as to eliminate or substantially reduce tool chatter by damping the tool motion during tool rotation.

Also, in the portable lathe of the present invention, a new and improved cutting tool feed mechanism is employed for feeding and damping a cutting tool in a manner which minimizes tool chatter and thereby reduces cutting imperfections and tool breakage and wear.

Further, in the portable lathe of the present invention, the lathe may be manipulated and operated by a single individual for example in the field and provides for rigidly securing the lathe to a pipe workpiece so that other support of the lathe or pipe workpiece is not required.

Other advantages of the portable lathe of the present invention will be in part obvious and in part pointed out more in detail hereinafter.

A better understanding of the invention will be obtained from the following detailed description and the accompanying drawings of an illustrative application of the invention.

BRIEF DESCRIPTION OF THE DRAWINGS

In the drawings:

FIG. 1 is an isometric view, partly broken away, showing an embodiment of the portable lathe of the present invention installed for machining the end of a pipe workpiece;

FIG. 2 is an enlarged, partial, generally axial section view, partly broken away and partly in section, of the portable lathe;

FIG. 3 is an enlarged, partial, generally transverse section view, partly broken away and partly in section, of the portable lathe;

FIG. 4 is a partial axial section view, partly broken away and partly in section, of a pair of abutting ends of pipe machined by the lathe in preparation for a butt weld.

BEST MODE FOR CARRYING OUT THE INVENTION

Figure 5:
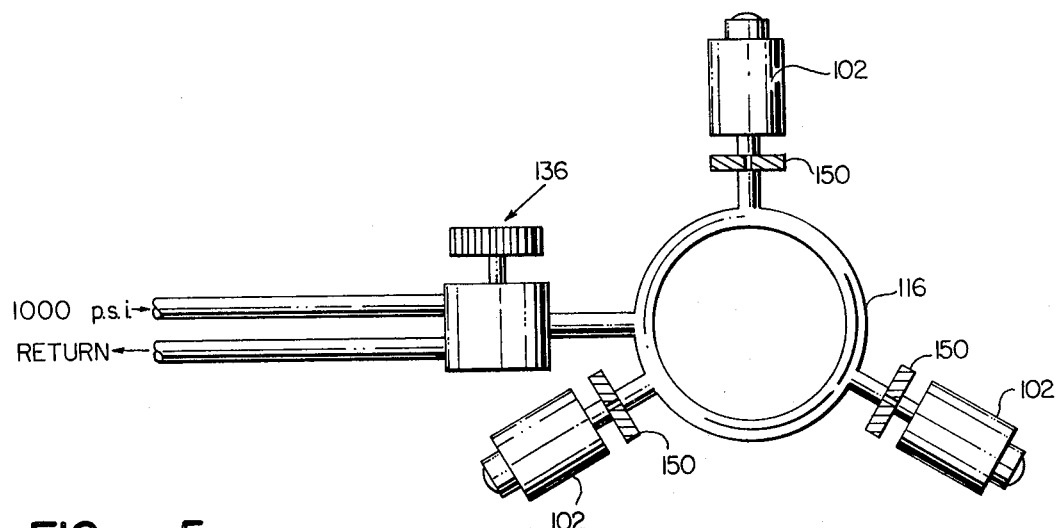
FIG. 5 is a generally diagrammatic representation, partly broken away, of a hydraulic tool advancing system of the lathe.

Referring now to the drawings in detail wherein like numerals represent like parts throughout, an embodiment 10 of a portable lathe constructed in accordance with the present invention comprises a cast aluminum housing or frame 12 with a generally cylindrical forwardly projecting skirt or shroud 14 having a forward end opening 16 for receiving the end of a pipe workpiece for machining. The portable lathe 10 for example may be designed to machine pipe up to a 6" nominal diameter or up to a 12" nominal diameter and the cylindrical shroud 14 is dimensioned accordingly to have a forward end opening for receiving pipe up to either 6" or 12" nominal diameter.

The shroud 14 has a forward collar or ring 18, a rear coaxial generally cylindrical section 20 and an intermediate coaxial, generally cylindrical web 22 with angularly spaced windows or openings 24 for viewing and inspecting a machining operation within the shroud. Also, for safety, a perforated sheet metal band 26 is mounted on the intermediate cylindrical web 22 of the shroud 14 to protect the lathe operator against injury from metal chips and yet to permit visual inspection of the machining operation through the band perforations and shroud windows 24.

A suitable hydraulic, positive displacement rotary drive motor 30 is secured to a rear end face 32 of the housing 12 via a motor housing mounting flange 34 and with its motor drive shaft 36 extending forwardly through a rear central opening 38 in the housing 12 coaxially into the shroud cavity. A tool rotor 40 of the lathe is rotated by the hydraulic drive motor 30 via a coaxial spline drive 42 comprising a forwardly projecting, outer cup-shaped spline member 44 mounted on and keyed to the forward end of the motor drive shaft and secured thereto by a suitable stud fastener 46 threaded into the forward end of the drive shaft 36. A generally flat annular cutting tool support plate 48 of the tool rotor 40 is secured to an inner, rearwardly projecting, annular spline member 50 received within and driven by the outer, forwardly projecting spline member 44. The cutting tool support plate 48 is thereby connected to be rotated by the hydraulic drive motor 30 while the tool support plate 48 is advanced or fed in a forward axial direction for machining the end of a pipe workpiece or in the rearward axial direction for withdrawing the plate supported cutting tools from a workpiece.

A pair of axially spaced needle bearings 52, 53 (or in the alternative, suitable plastic sleeve bearings, not shown) are mounted coaxially within the inner annular spline member 50 between the forward face of the cutting tool support plate 48 and the rear end of the inner spline member 50 for receiving, aligning and rigidly supporting the portable lathe on a rear end of a mandrel 56 inserted into a pipe workpiece. In addition a suitable needle bearing 58 is mounted on a forward axial extention 60 of the stud fastener 46 for engagement by an inner cylindrical end 62 of the mandrel 56 to assist in aligning and supporting the portable lathe 10. The needle bearing 58 has an outer race 64 with a partially hemispherical outer surface to facilitate insertion of the mandrel onto the needle bearing 58.

The mandrel 56 is made sufficiently long to extend into the pipe workpiece forwardly of the forward collar or ring 18 of the shroud 14 and comprises a shaft 66 with an enlarged forward end 68 with three equiangularly spaced, axially extending and axially tapered slots 70 (e.g. having a 12° taper) for receiving three flat, substantially identical mandrel locating plates 72. The three locating plates 72 have inner axially tapered edges with a taper corresponding to that of the shaft support slots 70 and are held within the shaft support slots 70 by a pair of axially spaced elastic bands 74 received within peripheral slots in the plates 72 so that the outer edges 76 of the three locating plates 72 extend parallel to and at the same radius from the axis of the mandrel shaft 66. A forward adjustment or abuttment washer 78 of the mandrel 56 is mounted on the forward end of a threaded adjustment rod 80 mounted within a threaded axial bore in the mandrel shaft 66. The adjustment washer 78 is axially adjustable at the rear end of the mandrel by rotating the threaded adjustment rod 80 with a suitable socket wrench (not shown). Accordingly, the forward end of the mandrel 56 can be mounted generally coaxially within a pipe workpiece by inserting the mandrel and then drawing the mandrel locating plates 72 into firm engagement with the internal generally cylindrical surface of the pipe by rotating the adjustment rod 80 with a suitable socket wrench. After the mandrel 56 is thereby firmly secured to the pipe workpiece, the portable lathe 10 can be mounted on a rear projecting end of the mandrel shaft 66 as shown in FIG. 2.

Referring to FIG. 4, a pair of pipe end sections 90, 92 (e.g. having a wall thickness from 0.080 inch to 1 5/16 inch) are shown with their abutting edges properly machined for butt welding. The two end sections of pipe are mounted in axial alignment (i.e. with their centerlines coaxial) and are machined so that the inside surfaces 94 of both abutting ends are coaxial and have the same I.D. around the entire inner surface. Also, the mating end faces 96, 97 of the two pipe sections are machined to have (a) coaxial abutting flat "root lands" having the same radial thickness and O.D. and (b) outer beveled or recessed annular portions (e.g. with a 37½° bevel) where the weld "filler" material is applied. With the two abutting ends of pipe machined in that manner, a high structural quality butt weld can be provided around the entire abutting ends of pipe automatically with a welding machine. If the pipe ends are not properly prepared in that or similar manner, an imperfect butt weld can result having imperfections which cannot be readily ascertained.

The housing 12 has three equiangularly spaced enlargements 100 at the inside of the rear cylindrical section 20 of its shroud 14. Three linear hydraulic actuators 102 are mounted within equiangularly spaced axially extending threaded bores 104 in the enlargements 100 for axially supporting and feeding the cutting tool support plate 48. An annular thrust plate 106 with three equiangularly spaced roller bearing support yokes 108 is provided between the linear actuators 102 and the tool support plate 48 and suitable roller bearings 110 are mounted within the support yokes 108 for engaging a rear flat face 112 of the cutting tool support plate 48. The annular thrust plate 106 is keyed to the housing 12 by an axially extending rod 114 fixed to the housing, for retaining the three roller bearings 110 in axial alignment with the three linear actuators 102.

A hydraulic conduit 116 in the rear end of the housing 12 is connected to the rear end of each of the three linear actuators 102 for conducting hydraulic fluid to and from the hydraulic actuators 102 for advancing and retracting the cutting tool support plate 48. Also, three equiangularly spaced tool return springs 118 are provided which bias the tool support plate 48 in the rearward direction. The return springs 118 shown are constant force extendible leaf springs which assume a coiled position in their relaxed state. The outer uncoiled end of each spring is secured to the tool support plate 48 and the coiled end of each spring is mounted on a suitable support frame 120 secured to the rear end face of the drive spline 44.

A control console 130 mounted on the rear end of the lathe housing 12 has electrical push buttons 131-134 for controlling the operation of the lathe. Included are (a) an on-off push button switch 131 for selectively operating a remote constant speed drive motor (not shown) for a remote variable displacement hydraulic pump (not shown); (b) an on-off push button switch 132 for selectively operating a remote solenoid valve (not shown) for supplying hydraulic fluid at 3000 p.s.i. established by a pressure relief valve (not shown) for actuating three hydraulic clamps 160 (hereinafter described), the 3000 p.s.i. clamping pressure being held by a check valve (not shown) until the solenoid valve is deenergized by the push button switch 132; (c) an on-off push button switch 133 for selectively operating a remote solenoid valve (not shown) for supplying hydraulic fluid for operating the hydraulic drive motor at 1000 p.s.i. established by a pressure relief valve (not shown); and (d) an on-off push button switch 134 for selectively operating a remote solenoid valve (not shown) for supplying hydraulic fluid at 1000 p.s.i. from the remote hydraulic pump (not shown) to the linear actuators 102 for advancing the tool support plate 48. In addition, a suitable manually operated rotary control valve 136 is provided on the console for controlling the rate at which the hydraulic fluid supplied to the linear actuators 102 is exhausted to a hydraulic return line and thereby for controlling the rate at which the cutting tools are advanced. The feed control valve 136 thereby provides for establishing a relatively constant hydraulic pressure for operating the linear actuators 102 at any pressure level within the available pressure range. In theory (and in practice for a uniform width of cut), the control valve 136 can be set (e.g. so that the tool support plate 48 requires 2000 to 3000 inch-lbs. of drive torque with a 12" nominal diameter pipe) to provide for fully cutting the pipe workpiece without further operator adjustment. Also, since tool chatter is dependent on tool edge pressure, the direct hydraulic feed control provided by the control valve 136 enables the operator to establish an optimum tool pressure without tool chatter.

The control console 130 also employs a manually adjustable feed limit control 148 used with a rod 142 engaging the rear face of the thrust plate 106 for deenergizing the feed solenoid when an outer tool limit set by the control 148 is reached. In addition, a tilt safety switch (not shown) is preferably provided within the console 130 to automatically terminate tool feed and rotation if the lathe housing 12 rotates more than about 10° during machining from its normal installed position shown in FIG. 1. Further, the four electrical push-button switches 131–134 are remotely electrically interlocked so that lathe clamping, tool rotation and tool feed have to be effected in that order with the respective push-button switches.

A control knob 140 allows the operator to change the rotational speed of the tool support plate 48, which is required in order to establish the optimum surface speed of the cutting edges—speeds determined by pipe diameter and pipe material.

Individual hydraulic hoses and electrical lines are provided for connecting the four electrical push button switches 131–134 and three separate hydraulic systems of the lathe to a power unit (not shown) which is preferably provided as a wheeled unit adapted to be readily moved to the lathe operating area. Also, preferably the wheeled power unit employs a suitable hydraulic jack or lift (not shown) for the lathe, in which event the console 130 has a suitable three position up-off-down switch (not shown) for operation of the jack to raise and lower the portable lathe to facilitate installing it on the end of pipe workpiece and a mandrel mounted within the pipe workpiece as described.

The tool feed actuators 102 are interconnected via their common supply conduit 116. Also, an orifice plate 150 is mounted in the rear end of each actuator mounting bore 104 for restricting the rate of flow of hydraulic fluid to and from the actuator 102 during a lathe machining operation and thereby to provide limited hydraulically dampening of the unbalanced forces on the tool support plate 48 as the cutting tools revolve.

Three generally equiangularly spaced cutting tools (of which only one tool 152 is shown in the drawings) typically are mounted on the tool support plate 48 for respectively (a) boring a predetermined I.D. in the end of the pipe workpiece; (b) beveling the outer edge of the pipe edge; and (c) facing an intermediate "root land" on the end of the pipe. As the cutting tool support plate 48 and cutting tools rotate during a machining operation, the rearward axial thrust from the machining operation is shared by the three linear actuators 102 in changing proportions. More particularly, the different axial and radial forces on the three cutting tools 152–154 vary the axial reaction forces on the three linear actuators 102 as the support plate 48 rotates. Also, because the support plate 48 is driven via a relatively loose spline connection, it is free to wobble slightly. Thus, because of the restricted hydraulic interconnection between the linear actuators 102, the hydraulic system acts to dampen the tool plate wobble to substantially reduce or eliminate cutting tool chatter, a problem which traditionally plagues portable lathes of the type to which the present invention is directed. As a result, machining imperfections, tool wear and tool breakage normally caused by tool chatter, are substantially reduced or eliminated and the portable lathe provides high quality machining.

Three equiangularly spaced hydraulic clamps 160 are provided on the forward collar 18 of the shroud 14 in angular alignment with the three equiangularly spaced linear actuators 102. Each clamp 160 comprises a linear actuator or ram 162 mounted within a threaded radial bore 164 in the forward shroud collar 18 and an outer cover plate 166 having a drilled passageway 168 for conducting hydraulic fluid between a hydraulic conduit 170 in the housing and the outer end of the linear actuator 162. The three hydraulic clamps 160 are connected to the rear console 130 via a common hydraulic conduit 172 for combined operation of the three hydraulic clamps.

The three hydraulic clamps 160 are simultaneously operated after the portable lathe is mounted on a pipe workpiece to clamp the lathe 10 onto a section of the pipe workpiece between the cutting tools and the mandrel locating plates 72 and thereby to rigidly support the workpiece against bending or deflection under the unequal machining forces of the cutting tools as they rotate.

The three hydraulic clamps 160 provide for uniformly clamping the lathe 10 to the O.D. surface of the pipe workpiece even where the pipe O.D. and I.D surfaces are not concentric. Also, each clamp 160 has a toggle jaw 176 to intensify the clamp grip on the pipe workpiece. Each toggle jaw 176 is mounted on the inside of the forward shroud collar 18 by a pair of conventional C-clip retainers or springs 178 pivotally connected to the toggle jaw 176 by a pivot pin 180 and adapted to be pivotally connected to the housing by a removable retainer pin 182. A circumferentially extending slot 184 is provided in the lathe housing 12 for receiving the inner C-clip retainer 178 and a short axial bore 186 is provided in the housing for receiving the removable retainer pin 182. Also, the inside of the shroud collar 18 is machined to provide an axially extending arcuate pivot slot 188 for each toggle jaw 176 angularly spaced in the direction of lathe rotation from the respective toggle jaw actuator 162. Three toggle jaws 176 of appropriate size are mounted inside the shroud collar 18 to rigidly clamp a pipe workpiece therebetween when the clamps 160 are hydraulically actuated. During machining, a toggle or wedging action is produced by the opposing torsional forces on each jaw 176 to firmly grip the supported pipe workpiece.

A set of three substantially identical toggle jaws is provided for each nominal pipe size and the appropriate set of toggle jaws is readily installed with the retaining pins 182 for the size of pipe to be machined. The toggle jaws for the largest and smallest nominal diameter size pipes for which the portable lathe is used, are shown in part in broken lines and in full lines respectively in FIGS. 2 and 3. Each of the three smallest toggle jaws has an inner knurled gripping face for engagement with the pipe workpiece. In contrast, each of the largest toggle jaws preferably employs a removable brass gripping shoe 190 and so that the same set of three shoes can be employed in all of the sets of toggle jaws larger than the smallest.

As will be apparent to persons skilled in the art, various modifications, adaptations and variations of the foregoing specific disclosure can be made without departing from the teachings of the present invention.

I claim:

1. In a portable lathe for machining the end of a pipe workpiece, comprising a lathe frame, a rotary drive motor mounted on the frame, a rotatable cutting tool support driven in one angular direction by the motor, means for axially advancing the cutting tool support in a forward axial direction for feeding a cutting tool mounted thereon for machining the end of the pipe workpiece and mounting means for mounting the lathe on a pipe workpiece with the cutting tool support generally coaxial therewith for machining the end of the pipe workpiece, the mounting means including a locating mandrel coaxial with the cutting tool support having a forward end adapted to be mounted generally coaxially within a pipe workpiece, the improvement wherein the lathe frame has a forward annular collar generally coaxial with and forwardly of the cutting tool support for receiving a pipe workpiece mounted on the lathe locating mandrel, said mandrel having means for being mounted in a fixed position relative to said pipe workpiece, a plurality of angularly spaced clamps mounted on the annular collar for externally clamping a pipe workpiece within the collar and generally coaxial with and forwardly of the cutting tool support to restrain the lathe against rotation relative to the pipe workpiece while the end of the pipe workpiece is machined by the lathe, the cutting tool support advancing means comprising at least three angularly spaced axially extending linear hydraulic actuators mounted on the lathe frame rearwardly of the cutting tool support, adjustable valve means for adjusting the rate of flow of hydraulic fluid to the linear hydraulic actuators for controlling the rate of advancement of the tool support, flow restrictor means permitting restricted hydraulic fluid flow between the hydraulic actuators for damping an unbalanced tool reaction force on the cutting tool support during machining, and a nonrotatable and axially shiftable annular thrust member mounted coaxially with the rotatable tool support between the tool support and the linear hydraulic actuators, the annular thrust member having a plurality of angularly spaced, rotatable thrust rollers engageable with the tool support and being engageable by the linear hydraulic actuators for axially advancing the tool support via the thrust rollers.

2. In a portable lathe for machining the end of a pipe workpiece, comprising a lathe frame, a rotary drive motor mounted on the frame, a rotatable cutting tool support driven in one angular direction by the motor, means for axially advancing the cutting tool support in a forward axial direction for feeding a cutting tool mounted thereon for machining the end of a pipe workpiece, and mounting means for mounting the lathe on a pipe workpiece with the cutting tool support generally coaxial therewith for machining the end of the pipe workpiece, the mounting means including a locating mandrel coaxial with the cutting tool support having a forward end adapted to be mounted generally coaxially within a pipe workpiece, the improvement wherein the lathe frame has a forward annular collar generally coaxial with and forwardly of the cutting tool support for receiving a pipe workpiece mounted on the lathe locating mandrel, said mandrel having means for being mounted in fixed position relative to said pipe workpiece, a plurality of angularly spaced clamps mounted on the annular collar for externally clamping a pipe workpiece within the collar and generally coaxially with the cutting tool support to restrain the lathe against rotation relative to the pipe workpiece while the end of the pipe workpiece is machined by the lathe, each of the plurality of angularly spaced clamps comprising a clamping jaw having a clamping surface engageable with the pipe workpiece within the collar and being pivotally mounted on the annular collar of the frame about an axis generally parallel to the axis of the tool support and angularly spaced in one angular direction from the clamping surface of the jaw for wedging the clamping jaw between the workpiece and annular collar with the reaction torque from machining.

3. In a portable lathe for machining the end of a pipe workpiece, comprising a lathe frame, a rotary drive motor mounted on the frame, a rotatable cutting tool support driven in one angular direction by the motor, means for axially advancing the cutting tool support in a forward axial direction for feeding a cutting tool mounted thereon for machining the end of a pipe workpiece, and mounting means for mounting the lathe on a pipe workpiece with the cutting tool support generally coaxial therewith for machining the end of the pipe workpiece, the mounting means including a locating mandrel coaxial with the cutting tool support having a forward end adapted to be mounted generally coaxially within a pipe workpiece, the improvement wherein the lathe frame has a forward annular collar generally coaxial with and forwardly of the cutting tool support for receiving a pipe workpiece mounted on the lathe locating mandrel, said mandrel having means for being mounted in fixed position relative to said pipe workpiece, a plurality of angularly spaced clamps mounted on the annular collar for externally clamping a pipe workpiece within the collar and generally coaxially with the cutting tool support to restrain the lathe against rotation relative to the pipe workpiece while the end of the pipe workpiece is machined by the lathe, each of the clamps comprising a hydraulic actuator mounted on the annular collar for operating the clamp and a jaw engageable by the respective hydraulic actuator and pivotally mounted on the annular collar of the frame about an axis generally parallel to the axis of the tool support for pivotal operation by the respective clamp actuator into engagement with a pipe workpiece within the collar, and wherein the lathe comprises hydraulic means for supplying hydraulic fluid to the plurality of hydraulic clamp actuators for operation thereof at the same hydraulic pressure.

4. A portable lathe according to claim 1 wherein each clamp comprises a jaw engageable by the respective hydraulic actuator and pivotally mounted on the annular collar of the frame about an axis generally parallel to the axis of the tool support for pivotal operation by the respective clamp actuator into engagement with a pipe workpiece within the collar.

5. In a portable lathe for machining the end of a pipe workpiece, comprising a lathe frame, a rotary drive motor mounted on the frame, a rotatable cutting tool support driven in one angular direction by the motor, means for axially advancing the cutting tool support in a forward axial direction for feeding a cutting tool mounted thereon for machining the end of a pipe workpiece, and mounting means for mounting the lathe on a pipe workpiece with the cutting tool support generally coaxial therewith for machining the end of the pipe workpiece, the mounting means including a locating mandrel coaxial with the cutting tool support having a forward end adapted to be mounted generally coaxially within a pipe workpiece, the improvement wherein the lathe frame has a forward annular collar generally coaxial with and forwardly of the cutting tool support for receiving a pipe workpiece mounted on the lathe locating mandrel, a plurality of angularly spaced clamps mounted on the annular collar for externally clamping a pipe workpiece within the collar and generally coaxially with the cutting tool support to restrain the lathe against rotation relative to the pipe workpiece while the end of the pipe workpiece is machined by the lathe, and a drive spline means coaxial with the tool support, connecting the tool support for being driven by the motor and axially shifted by the advancing means, the drive spline means having annular drive and driven spline members in operative engagement and coaxial bearings means in one of said spline members for rotatably mounting the spline means on the rear end of said locating mandrel.

6. In a portable lathe for machining the end of pipe workpiece, comprising a lathe frame, a rotary drive motor mounted on the frame, a rotatable cutting tool support driven in one angular direction by the motor, means for axially advancing the cutting tool support in a forward axial direction for feeding a cutting tool mounted thereon for machining the end of a pipe workpiece, and mounting means for mounting the lathe on a pipe workpiece with the cutting tool support generally coaxial therewith for machining the end of the pipe workpiece, the mounting means including a locating mandrel coaxial with the cutting tool support having a forward end adapted to be mounted generally coaxially within a pipe workpiece, the improvement wherein the lathe frame has a forward annular collar generally coaxial with and forwardly of the cutting tool support for receiving a pipe workpiece mounted on the lathe locating mandrel, and a plurality of angularly spaced clamps mounted on the annular collar for externally clamping the pipe workpiece within the collar and generally coaxially with the cutting tool support to restrain the lathe against rotation relative to the pipe workpiece while the end of the pipe workpiece is machined by the lathe, and each clamp comprises a hydraulic actuator mounted on the annular collar for operating the clamp and each clamp comprises a jaw engageable by the respective hydraulic actuator and pivotally mounted on the annular collar of the frame about an axis generally parallel to the axis of the tool support for pivotal operation by the respective actuator into engagement with the pipe workpiece within the collar.

7. In a portable lathe for machining the end of pipe workpiece, comprising a lathe frame, a rotary drive motor mounted on the frame, a rotatable cutting tool support driven in one angular direction by the motor, means for axially advancing the cutting tool support in a forward axial direction for feeding a cutting tool mounted thereon for machining the end of pipe workpiece, and mounting means for mounting the lathe on a pipe workpiece with the cutting tool support generally coaxial therewith for machining the end of the pipe workpiece, the mounting means including a locating mandrel coaxial with the cutting tool support having a forward end adapted to be mounted generally coaxially within a pipe workpiece, the improvement wherein the lathe frame has a forward annular collar generally coaxial with and forwardly of the cutting tool support for receiving a pipe workpiece mounted on the lathe locating mandrel, and a plurality of angularly spaced clamps mounted on the annular collar for externally clamping a pipe workpiece within the collar and generally coaxially with the cutting tool support to restrain the lathe against rotation relative to the pipe workpiece while the end of the pipe workpiece is machined by the lathe, and each of the plurality of angularly spaced clamps comprises a clamping jaw having a clamping surface engageable with the pipe workpiece within the collar and is pivotally mounted on the annular collar of the frame about an axis generally parallel to the axis of the tool support and angularly spaced in said one angular direction from the clamping surface of the jaw for wedging the jaw between the workpiece and annular collar with the reaction torque from machining.

* * * * *